(12) United States Patent
Li

(10) Patent No.: US 12,127,228 B2
(45) Date of Patent: Oct. 22, 2024

(54) CONTROL INFORMATION TRANSMISSION METHOD, RETRANSMISSION METHOD AND APPARATUS, TERMINAL, AND STORAGE MEDIUM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 449 days.

(21) Appl. No.: 17/594,316

(22) PCT Filed: Apr. 16, 2019

(86) PCT No.: PCT/CN2019/082918
§ 371 (c)(1),
(2) Date: Oct. 11, 2021

(87) PCT Pub. No.: WO2020/210991
PCT Pub. Date: Oct. 22, 2020

(65) Prior Publication Data
US 2022/0167356 A1 May 26, 2022

(51) Int. Cl.
*H04W 72/54* (2023.01)
*H04L 1/08* (2006.01)
(Continued)

(52) U.S. Cl.
CPC ............ *H04W 72/54* (2023.01); *H04L 1/08* (2013.01); *H04L 5/0053* (2013.01);
(Continued)

(58) Field of Classification Search
CPC ..... H04W 72/08; H04W 72/12; H04W 72/04; H04W 72/042; H04W 72/0446; H04W 72/0453; H04W 72/044; H04W 72/50; H04W 74/002; H04L 1/00; H04L 1/08; H04L 5/0053; H04L 5/0055;
(Continued)

(56) References Cited

U.S. PATENT DOCUMENTS

2013/0083706 A1   4/2013   Lin
2013/0083748 A1   4/2013   Li
(Continued)

FOREIGN PATENT DOCUMENTS

CN   100372434   *   2/2008   ............... H04Q 7/38
CN   102263616 A       11/2011
(Continued)

OTHER PUBLICATIONS

Sony. "Report on informal email discussion [eMTC-5] on remaining PDSCH issues for Rel-13 eMTC" 3GPP TSG RAN WGl Meeting #83 RI-157514, Nov. 15, 2015 (Nov. 15, 2015), sections 2-3.
(Continued)

*Primary Examiner* — Warner Wong
(74) *Attorney, Agent, or Firm* — Syncoda LLC; Feng Ma

(57) ABSTRACT

A control information transmission method includes: receiving, on a time slot n of a PUSCH, uplink data sent by a terminal, and sending, at a specified frequency-domain position on a time slot n+k of a PDSCH, control information to the terminal, wherein both n and k are integers.

13 Claims, 6 Drawing Sheets

(51) Int. Cl.
  *H04L 5/00* (2006.01)
  *H04W 72/0446* (2023.01)
  *H04W 72/0453* (2023.01)
  *H04W 72/23* (2023.01)

(52) U.S. Cl.
  CPC ... *H04W 72/0446* (2013.01); *H04W 72/0453* (2013.01); *H04W 72/23* (2023.01)

(58) Field of Classification Search
  CPC . H04L 5/0058; H04L 12/1868; H04L 5/0078; H04L 1/1812; H04L 1/1854; H04L 1/1864; H04L 1/1896; H04L 47/76; H04L 1/0027; H04L 1/1887
  See application file for complete search history.

(56) References Cited

U.S. PATENT DOCUMENTS

| | | | |
|---|---|---|---|
| 2015/0289234 A1* | 10/2015 | Zhao | H04L 1/1812 370/329 |
| 2018/0139014 A1 | 5/2018 | Xiong et al. | |
| 2019/0044649 A1 | 2/2019 | Kim et al. | |
| 2019/0090218 A1 | 3/2019 | Noh et al. | |
| 2019/0141693 A1* | 5/2019 | Guo | H04L 5/0044 |
| 2019/0372723 A1 | 12/2019 | Xiong et al. | |
| 2019/0394009 A1 | 12/2019 | Yoshimoto et al. | |
| 2020/0068594 A1* | 2/2020 | Li | H04W 72/04 |
| 2020/0120700 A1* | 4/2020 | Shao | H04L 5/0094 |
| 2020/0367265 A1 | 11/2020 | Wang et al. | |
| 2022/0132446 A1* | 4/2022 | Astrom | H04L 5/0094 |
| 2022/0361220 A1* | 11/2022 | Zewail | H04W 72/23 |
| 2023/0224840 A1* | 7/2023 | Hu | H04B 7/18513 370/350 |

FOREIGN PATENT DOCUMENTS

| | | | | |
|---|---|---|---|---|
| CN | 107637000 A | | 1/2018 | |
| CN | 112514499 | * | 3/2020 | ........... H04L 5/0091 |
| EP | 3091811 A1 | * | 11/2016 | .......... H04W 52/146 |
| EP | 3695559 A1 | | 8/2020 | |
| IN | 102739374 A | | 10/2012 | |
| WO | 2017045571 A1 | | 3/2017 | |
| WO | 2017186174 A1 | | 11/2017 | |
| WO | 2018018620 A1 | | 2/2018 | |
| WO | 2018126932 A1 | | 7/2018 | |
| WO | 2018143174 A1 | | 8/2018 | |

OTHER PUBLICATIONS

International Search Report in the international application No. PCT/CN2019/082918, mailed on Jan. 17, 2020.
First Office Action of the Chinese application No. 201980000683.1, issued on Aug. 17, 2021.
English translation of the Written Opinion of the International Search Authority in the international application No. PCT/CN2019/082918, mailed on Jan. 17, 2020.
3GPP TSG RAN WG1 Meeting #89 R1-1708743, Hangzhou, P.R. China May 15-19, 2017; Agenda item: 7.1.3.3.5; Source: Coolpad, Xiaomi; Title: CB-Group based HARQ-ACK feedback and retransmission.
Notice of Allowance of the Chinese application No. 201980000683.1, issued on Mar. 3, 2022.
3GPP TSG-RAN WG1#88bis R1-1705245, Spokane, WA, USA, Apr. 3-7, 2017; Agenda item: 8.1.3.3.4; Source: Nokia, Alcatel-Lucent Shanghai Bell; Title: Dynamic scheduling based transmission for URLLC.
Office Action of the Indian application No. 202147051456, issued on Apr. 7, 2022.
Supplementary European Search Report in the European application No. 19924865.9, mailed on Mar. 25, 2022.

\* cited by examiner symbols occupied by PDSCH

CONTROL INFORMATION TRANSMISSION METHOD, RETRANSMISSION METHOD AND APPARATUS, TERMINAL, AND STORAGE MEDIUM

CROSS-REFERENCE TO RELATED APPLICATION

This application is a U.S. national stage of International Application No. PCT/CN2019/082918 filed on Apr. 16, 2019, the disclosure of which is hereby incorporated by reference in its entirety.

TECHNICAL FIELD

The present disclosure relates to the field of communications, and in particular to a method for transmitting control information, a method for retransmitting control information, an apparatus, a terminal, and a storage medium.

BACKGROUND

Enhanced Ultra Reliable Low Latency Communication (eURLLC) has high requirements for transmission reliability and transmission delay. End-to-end transmission delay is even required to be 0.5 ms.

In the current protocol version, for retransmission of Physical Uplink Shared Channel (PUSCH), uplink data is retransmitted directly by a base station through a manner of scheduling a terminal.

The requirement of transmission delay of the eURLLC service is high, and the end-to-end delay is even required to be 0.5 ms. The method of scheduling the terminal to perform retransmission by the base station cannot meet the requirement for transmission delay.

SUMMARY

Embodiments of the present disclosure provide a method for transmitting control information, a transmission method, an apparatus, a terminal, and a storage medium, which can solve a problem of long retransmission delay of uplink data. The technical solutions are as follows.

According to one aspect of the present disclosure, a method for transmitting control information is provided. The method includes the following operations.

The uplink data sent by a terminal is received in a time slot n of aPUSCH.

The control information is sent to the terminal at designated frequency domain positions of a time slot n+k of a Physical Downlink Shared Channel (PDSCH). The n and k are integers.

In one possible embodiment, the control information includes at least one of the following:
  an Acknowledgement (ACK) feedback of the uplink data;
  a negative acknowledgement (NACK) feedback of the uplink data;
  channel quality information of the PUSCH; and
  power control information of the terminal.

In one possible embodiment, the method further includes the following operations.

The k is configured to the terminal by using a target PDCCH format. The target Physical Downlink Control Channel (PDCCH) format is a PDCCH format 0_0 or a PDCCH format 0_1 that is used for configuring the PUSCH.

Alternatively, the k is configured to the terminal by using Radio Resource Control (RRC) signaling.

In one possible embodiment, the value of k is 0.

In one possible embodiment, the designated frequency domain positions are located on two sides of a frequency domain resource position occupied by a pilot signal.

In one possible embodiment, the method further includes the following operations.

The next uplink data sent by the terminal at a designated resource position is received. The next uplink data is sent by the terminal after receiving the ACK in the control information.

Alternatively, the uplink data retransmitted by the terminal at a designated resource position is received. The uplink data is sent by the terminal after receiving the NACK in the control information.

In one possible embodiment, the designated resource position is a resource position that is configured by using a PDCCH. Alternatively, the designated resource position is a preconfigured resource position used for unauthorized transmission.

According to another aspect of the present disclosure, a method for transmitting control information is provided. The method includes the following operations.

The uplink data is sent to a base station in a time slot n of a PUSCH.

The control information sent by the base station is received at designated frequency domain positions of a time slot n+k of the PDSCH. Then and k are integers.

In one possible embodiment, the control information includes at least one of the following:
  an ACK of the uplink data;
  a NACK of the uplink data;
  channel quality information of the PUSCH; and
  power control information of the terminal.

In one possible embodiment, the method further includes the following operations.

A target PDCCH format sent by the base station is received. The target PDCCH format is used for configuring the k, and the target PDCCH format is a PDCCH format 0_0 or a PDCCH format 0_1 that is used for configuring the PUSCH. Alternatively, RRC signaling sent by the base station is received. The RRC signaling is used for configuring the k.

In one possible embodiment, the value of the k is 0.

In one possible embodiment, the designated frequency domain positions are located on two sides of a frequency domain resource position occupied by a pilot signal.

In one possible embodiment, the method further includes the following operation.

When the control information includes an ACK, next uplink data is sent at a designated resource position.

When the control information includes a NACK, the uplink data is retransmitted at the designated resource position.

In one possible embodiment, the designated resource position is a resource position that is configured by using a PDCCH. Alternatively, the designated resource position is a preconfigured resource position used for unauthorized transmission.

According yet another aspect of the present disclosure, an apparatus for transmitting control information is provided. The apparatus includes a receiving module and a sending module.

The receiving module is configured to receive uplink data sent by a terminal in a time slot n of a PUSCH.

The sending module is configured to send control information to the terminal at specified frequency domain position of a time slot n+k of the PDSCH. The n and k are integers.

In one possible embodiment, the control information includes at least one of the following:
an ACK of the uplink data;
a NACK of the uplink data;
channel quality information of the PUSCH; and
power control information of the terminal.

In one possible embodiment, the sending module is further configured to configure the k to the terminal by using a target PDCCH format. The target PDCCH format is a PDCCH format 0_0 or a PDCCH format 0_1 that is used for configuring the PUSCH. Alternatively, the sending module is further configured to configure the k to the terminal by using RRC signaling.

In one possible embodiment, the value of the k is 0.

In one possible embodiment, the designated frequency domain positions are located on two sides of a frequency domain resource position occupied by a pilot signal.

In one possible embodiment, the receiving module is further configured to receive next uplink data sent by the terminal at a designated resource position. The next uplink data is sent by the terminal after receiving an ACK feedback in the control information. Alternatively, the receiving module is further configured to receive the uplink data retransmitted by the terminal at the designated resource position. The uplink data is sent by the terminal after receiving a NACK feedback in the control information.

In one possible embodiment, the designated resource position is a resource position that is configured by using a PDCCH. Alternatively, the designated resource position is a preconfigured resource position used for unauthorized transmission.

According to a fourth aspect of the present disclosure, an apparatus for transmitting control information is provided. The apparatus includes a sending module and a receiving module.

The sending module is configured to send uplink data to a base station in a time slot n of a PUSCH.

The receiving module is configured to receive control information sent by the base station at designated frequency domain positions of a time slot n+k of the PDSCH. The n and k are integers.

In one possible embodiment, the control information includes at least one of the following:
an ACK of the uplink data;
a NACK of the uplink data;
channel quality information of the PUSCH; and
power control information of the terminal.

In one possible embodiment, the receiving module is configured to receive a target PDCCH format sent by the base station. The target PDCCH is used for configuring the k, and the target PDCCH format is a PDCCH format 0_0 or a PDCCH format 0_1 that is used for configuring to configure the PUSCH. Alternatively, the receiving module is configured to receive RRC signaling sent by the base station. The RRC signaling is used for configuring the k.

In one possible embodiment, the value of the k is 0.

In one possible embodiment, the designated frequency domain positions are located on two sides of a frequency domain resource position occupied by a pilot signal.

In one possible embodiment, the sending module is configured to: when the control information includes an ACK feedback, send next uplink data at a designated resource position; or when the control information includes a NACK feedback, retransmit the uplink data at the designated resource position.

In one possible embodiment, the designated resource position is a resource position configured by using a PDCCH. Alternatively, the designated resource position is a preconfigured resource position used for unauthorized transmission.

According to another aspect of the present disclosure, a terminal is provided. The terminal includes a processor, a transceiver and a memory.

The transceiver is connected to the processor.

The memory is used for storing instructions executable by the processor.

The processor is configured to load and execute the executable instructions to implement the method for transmitting control information as described in the above aspects.

According to another aspect of the present disclosure, an access network device is provided. The access network device includes a processor, a transceiver and a memory.

The transceiver is connected to the processor.

The memory is used for storing instructions executable by the processor.

The processor is configured to load and execute the executable instructions to implement the method for transmitting control information as described in the above aspects.

According to another aspect of the present disclosure, a computer readable storage medium is provided. The readable storage medium stores at least one instruction, at least one segment of a program, a code set, or an instruction set, and the at least one instruction, the at least one segment of a program, the code set, or the instruction set is loaded by the processor and is executed to implement the method for transmitting control information as described in the above aspects.

According to another aspect of the present disclosure, a computer readable storage medium is provided. The readable storage medium stores at least one instruction, at least one segment of a program, a code set, or an instruction set, and the at least one instruction, the at least one segment of a program, the code set, or the instruction set is loaded by the processor and is executed to implement the method for transmitting control information as described in the above aspects.

The advantageous effects of the technical solutions provided in the embodiments of the present disclosure include the following.

The control information is sent to the terminal in the time slot n+k of the PDSCH to make the terminal learn the feedback information of the uplink data in as little time as possible. The control information may be feedback information (ACK or NACK) of the uplink data. The uplink data is retransmitted when the feedback information is NACK, thereby ensuring the timeliness of the retransmission process and meeting the delay requirement of the eURLLC service.

BRIEF DESCRIPTION OF THE DRAWINGS

In order to more clearly illustrate the technical solutions in the embodiments of the present disclosure, the accompanying drawings required for use in the description of the embodiments will be briefly described below. It will be apparent that the accompanying drawings in the following description are merely some embodiments of the present disclosure, and other drawings may be obtained from these drawings without creative effort by a person of ordinary skill in the art.

DETAILED DESCRIPTION

In order to make the purposes, technical solutions and advantages of the present disclosure clearer, embodiments of the present disclosure will be described in further detail below with reference to the accompanying drawings.

The communication system and the service scenario described in the embodiments of the present disclosure are intended to describe the technical solutions of the embodiments of the present disclosure more clearly, and do not constitute a limitation on the technical solutions provided in the embodiments of the present disclosure. A person of ordinary skill in the art will appreciate that the technical solutions provided in the embodiments of the present disclosure are also applicable to similar technical problems with the evolution of the communication system and the emergence of a new service scenario.

Figure 1:
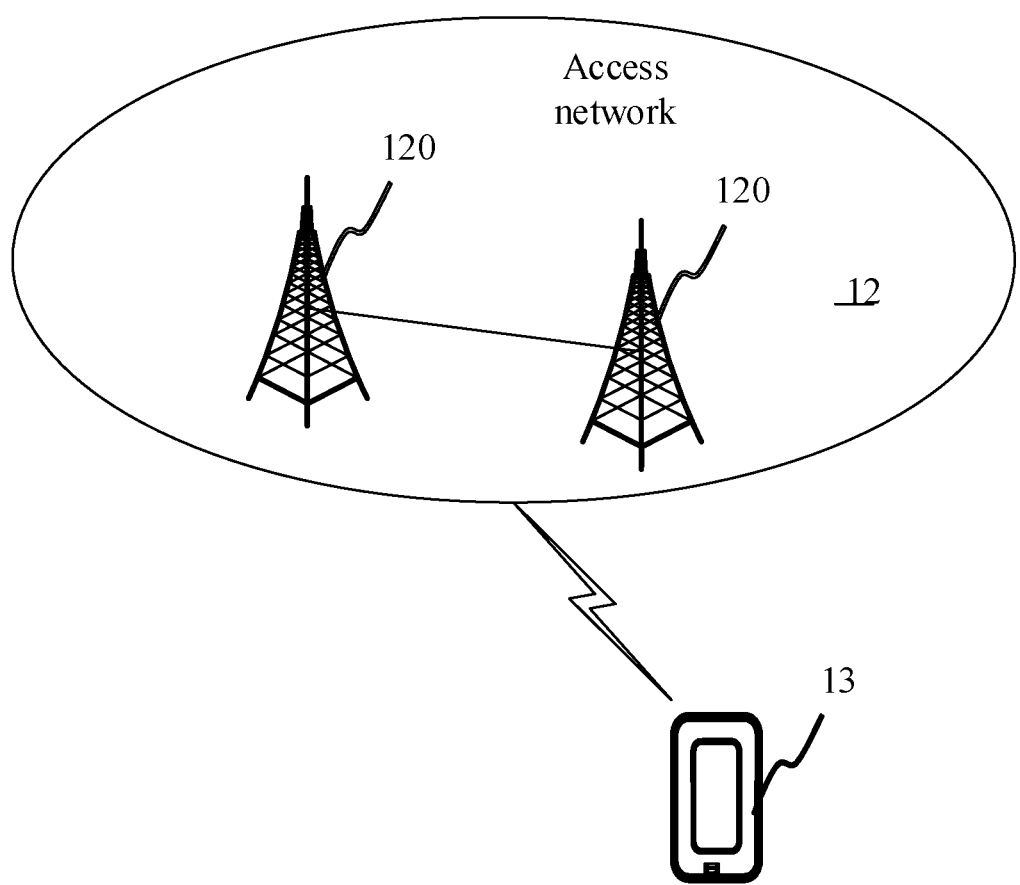
FIG. 1 is a schematic diagram of a communication system according to an exemplary embodiment of the present disclosure.

FIG. 1 is a system configuration diagram of a communication system according to an exemplary embodiment of the present disclosure. As shown in FIG. 1, the communication system may include an access network 12 and a terminal 13.

The access network 12 includes several access network devices 120. The access network device 120 and the core network device 110 communicate with each other via some interface technique, such as an Si interface in a Long-Term Evolution (LTE) system, and a NG interface in a New Radio (NR) system. The access network device 120 may be a base station, which is an apparatus deployed in the access network for providing a wireless communication function for a terminal. The base station may include various forms of Acer stations, micro base stations, relay stations, access points, and the like. In systems employing different radio access technologies, the names of devices having a base station function may vary, for example, in an LTE system, referred to as an eNodeB or an eNB, and in 5G NR systems, referred to as gNodeB or gNB. With the evolution of communication technology, the description of the name "base station" may vary. Although the embodiments of the present disclosure take a "base station" for example, the base station may be understood as an access network device used to provide user access function in various communication systems.

The terminal 13 may include various handheld devices, vehicle-mounted devices, wearable devices, computing devices that have wireless communication functions or other processing devices connected to a wireless modem, as well as various forms of User Equipment (UE), Mobile Station (MS), Terminal device and the like. For convenience of description, the devices mentioned above are collectively referred to as terminals. The access network device 120 and the terminal 13 communicate with each other via a certain air interface technique such as a Uu interface.

Alternatively, the above communication system has a higher requirement for the transmission delay, such as an uplink communication system supporting eURLLC service. In some embodiments, the eURLLC service requires an end-to-end delay of 0.5 ms.

A PDCCH carries Downlink Control information (DCI) sent by the base station to the UE. Currently, the DCI includes eight DCI formats: DCI format 0_0, DCI format 0_1, DCI format 1_0, DCI format 1_1, DCI format 2_0, DCI format 2_1, DCI format 2_2, and DCI format 2_3.

The DCI carried by the PDCCH has the following functions: scheduling the PUSCH, scheduling the PDSCH, indicating the Slot Format Indicator (SFI), indicating the Pre-emption Indicator (PI), and power control command. Specific DCI format and information carried are as following.

Before describing the PDCCH in detail, it is necessary to define some basic concepts of the downlink channel, which specifically include a Control-Channel Element (CCE), a Search Space, a Resource-Element Group (REG), a Resource-Element Group bundle (REG bundle) and a Control-Resource Set (CORESET) and the like. The CCE is a basic unit constituting a PDCCH and occupies six REGs on a frequency domain resource. A given PDCCH may consist of one, two, four, eight, and sixteen CCEs, the specific number of which are determined by the DCI payload size and the desired encoding rate. The number of CCEs constituting the PDCCH is referred to as the aggregation level. The base station may adjust the aggregation level of the PDCCH according to the radio channel state of the actual transmission to implement link adaptive transmission.

The aggregation level of the PDCCH actually transmitted by the base station is variable over time. Since there is no related signaling to inform the UE, the UE needs to blindly detect the PDCCH at different aggregation levels. The PDCCH to be blindly detected is referred to as a candidate PDCCH. The UE decodes all candidate PDCCHs in the Search Space. If the CRC check is passed, the content of the decoded PDCCH is considered to be valid for the UE, and subsequent operations are performed using the information (such as the scheduling indication, the time slot format indication/power control command, etc.) obtained by the decoding. In order to reduce the complexity of blind detection for UE, it is necessary to restrict the set of blind detection CCEs. The initial CCE number of the candidate PDCCH needs to be divisible by the number of CCEs of the candidate PDCCH.

The UE detects the PDCCH at limited CCE positions, thereby avoiding an increase in the complexity of blind detection. However, this is not sufficient. In the NR, in order to better control the complexity of blind detection, the control information format/aggregation level, the number of candidate control channels corresponding to the aggregation level, and the detection period of the Search Space in the time domain may be configured through higher layer parameters. Based on the configuration information, the complexity of blind detection may be flexibly controlled. Simply summed up, not every DCI format requires blind detection within the set of candidate CCEs.

Figure 2:
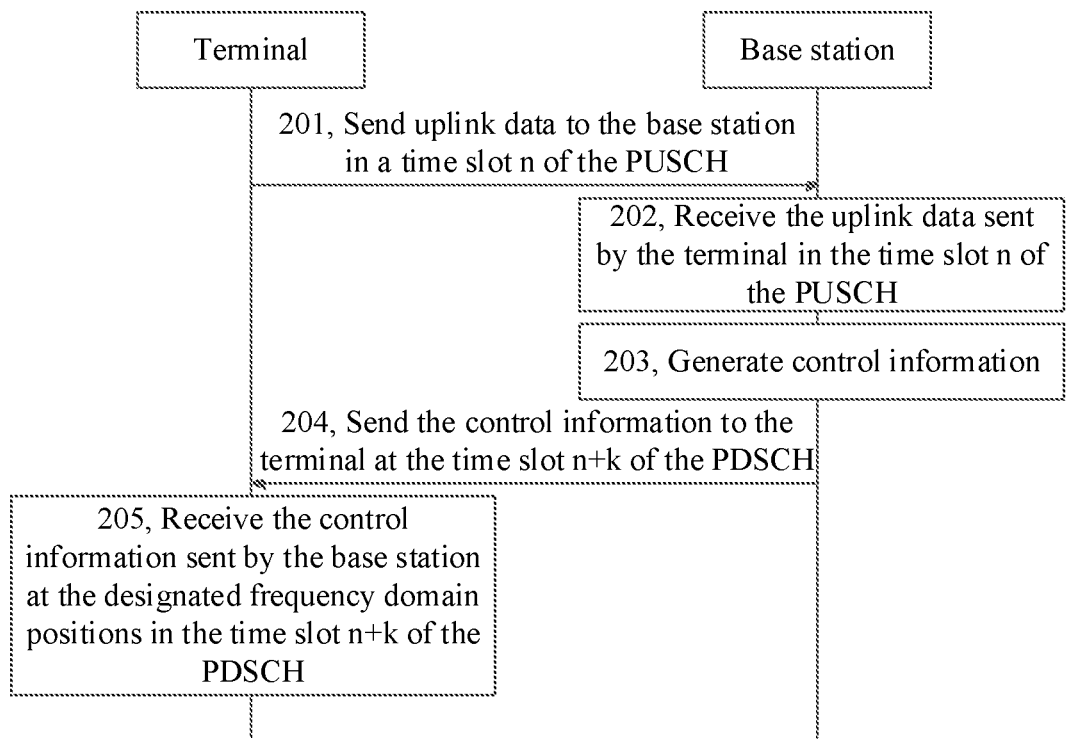
FIG. 2 is a flowchart of a method for transmitting control information according to an exemplary embodiment of the present disclosure.

FIG. 2 shows a flowchart of a method for transmitting control information according to a schematic embodiment of the present disclosure. The feedback method may be performed by the communication system shown in FIG. 1. The method includes the following steps.

In step 201, a terminal sends uplink data to a base station in a time slot n of a PUSCH.

In step 202, the base station receives the uplink data sent by the terminal in the time slot n of the PUSCH.

In step 203, the base station generates feedback information of the uplink data, the feedback information including ACK or NACK.

When the uplink data is successfully received, the base station generates an ACK, and when the uplink data is not received, or when the uplink data is received and the CRC of the uplink data fails, the base station generates a NACK.

In step 204, the base station sends the control information to the terminal at designated frequency domain positions of the time slot n+k of the PDSCH.

Alternatively, the control information includes an ACK or a NACK. In other embodiments, the control information may be used to carry other information, such as channel quality information of the PUSCH, power control information of the terminal, and the like.

Alternatively, k is less than a threshold value.

In step 205, the terminal receives the control information sent by the base station at the designated frequency domain positions in the time slot n+k of the PDSCH.

Alternatively, when the control information includes the NACK of the uplink data, the terminal retransmits the uplink data.

In conclusion, according to the method provided in this embodiment, by sending the feedback information (an ACK or a NACK) of the uplink data to the terminal in the time slot n+k of the PDSCH, the terminal may learn the feedback information of the uplink data in as short a time as possible. The uplink data is retransmitted when the feedback information is a NACK, thereby ensuring the timeliness of the retransmission process and meeting the delay requirement of the eURLLC service.

The step 201 and the step 205 may be implemented alone as a method for transmitting the control information on the terminal side, and the step 202, the step 203, and the step 204 may be implemented alone as a method for transmitting the control information on the base station side.

Figure 3:
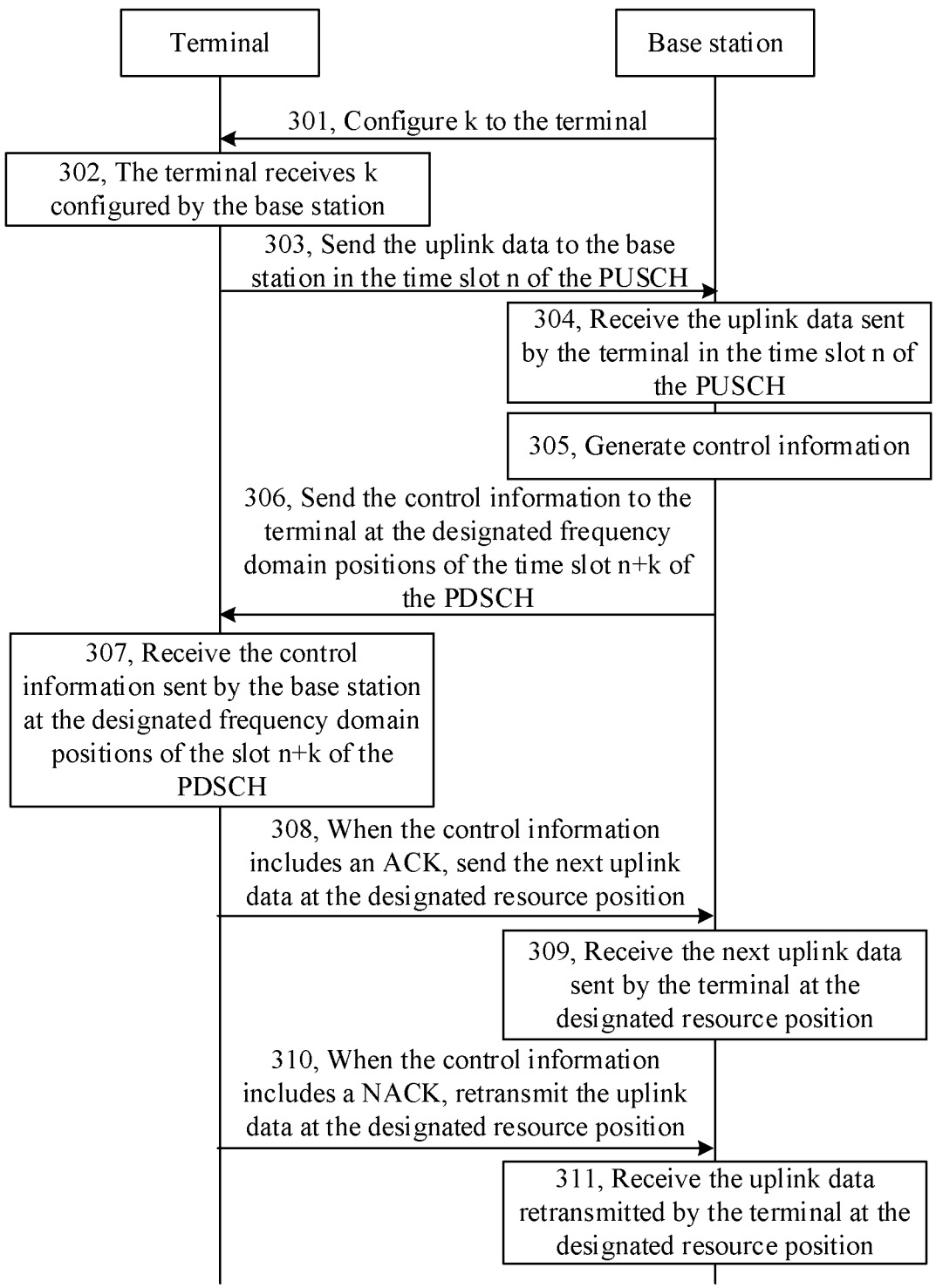
FIG. 3 is a flowchart of a method for transmitting control information according to an exemplary embodiment of the present disclosure.

FIG. 3 shows a flowchart of a method for transmitting control information according to a schematic embodiment of the present disclosure. The feedback method may be performed by the communication system shown in FIG. 1. The method includes the following steps.

In step 301, a base station configures k to a terminal.

A manner in which the base station configures the k to the terminal includes, but is not limited to, any one of the following two manners.

1. The base station configures k to the terminal by using a target PDCCH format.

The target PDCCH format is a PDCCH format of a resource that is used for configuring a PUSCH to a terminal. The target PDCCH format may be a PDCCH format 0_0 or a PDCCH format 0_1. The target PDCCH format may be understood as DCI using the target PDCCH format.

Schematically, N bits are added to the DCI format 0_0 and the DCI format 0_1 to indicate the value of k. Generally, the value of k is 0 or 1, and therefore the value of N is 1, that is, one bit may be used for characterization. However, the present disclosure does not exclude that the value of n is an integer greater than 1.

2. The base station configures k to the terminal by using RRC signaling.

In step 302, the terminal receives the k configured by the base station.

The step 301 and step 302 are optional steps. In some embodiments, the value of k may be configured by default, for example, the default value is 0. That is, ACK/NACK feedback must be performed on a PDSCH within a specified time slot. The specified time slot is a time slot in which the last symbol of the PUSCH used to transmit uplink data is located.

In step 303, the terminal sends uplink data to the base station in time slot n of the PUSCH.

The terminal determines the time-frequency resource in the time slot n of the PUSCH according to the target PDCCH, and transmits the uplink data to the base station by using the time-frequency resource in the time slot n.

In step 304, the base station receives the uplink data sent by the terminal in the time slot n of the PUSCH.

In step 305, the base station generates feedback information of the uplink data, the feedback information including an ACK or a NACK.

When the uplink data is successfully received, the base station generates an ACK. When the uplink data is not received, or when the uplink data is received and the CRC of the uplink data fails, the base station generates a NACK.

In step 306, the base station sends the control information to the terminal at designated frequency domain positions of time slot n+k of the PDSCH.

Alternatively, the control information includes an ACK or a NACK. In other embodiments, the control information may be used to carry other information, such as channel quality information of the PUSCH, power control information of the terminal, and the like. In this embodiment, the control information includes an ACK or a NACK, but the specific content carried in the control information is not limited.

In step 307, the terminal receives the control information sent by the base station at the designated frequency domain positions of the slot n+k of the PDSCH.

In Step 308, when the control information includes an ACK, the terminal sends the next uplink data at the designated resource position.

The designated resource position is a resource position configured by the base station using a PDCCH. Alternatively, the designated resource position is a preconfigured resource position used for unauthorized transmission.

In step 309, the base station receives next uplink data sent by the terminal at the designated resource position.

In step 310, when the control information includes a NACK, the terminal retransmits the uplink data at the designated resource position.

In step 311, the base station receives the uplink data retransmitted by the terminal at the designated resource position.

In conclusion, according to the method provided in this embodiment, by sending the feedback information (ACK or NACK) of the uplink data to the terminal in the time slot n+k of the PDSCH, the terminal may learn the feedback information of the uplink data in as short a time as possible. The uplink data is retransmitted when the feedback information is a NACK, thereby ensuring the timeliness of the retransmission process and meeting the delay requirement of the eURLLC service.

According to the method provided in this embodiment, by setting the k to be 0 by default, it is ensured that the ACK and NACK of the uplink data can be transmitted to the terminal in time, thereby instructing the terminal to start the retransmission of the uplink data in as short a time as possible, and saving consumption of control signaling between the base station and the terminal.

It should be noted that in the above embodiment, the steps performed by the terminal may be implemented alone as a retransmission method of the uplink data on the terminal side, and the steps performed by the base station may be implemented alone as a feedback method of the uplink data on the base station side.

It should be noted that the various embodiments described above may also be freely split and/or combined into new embodiments by those skilled in the art and are not limited thereto.

Figure 4:
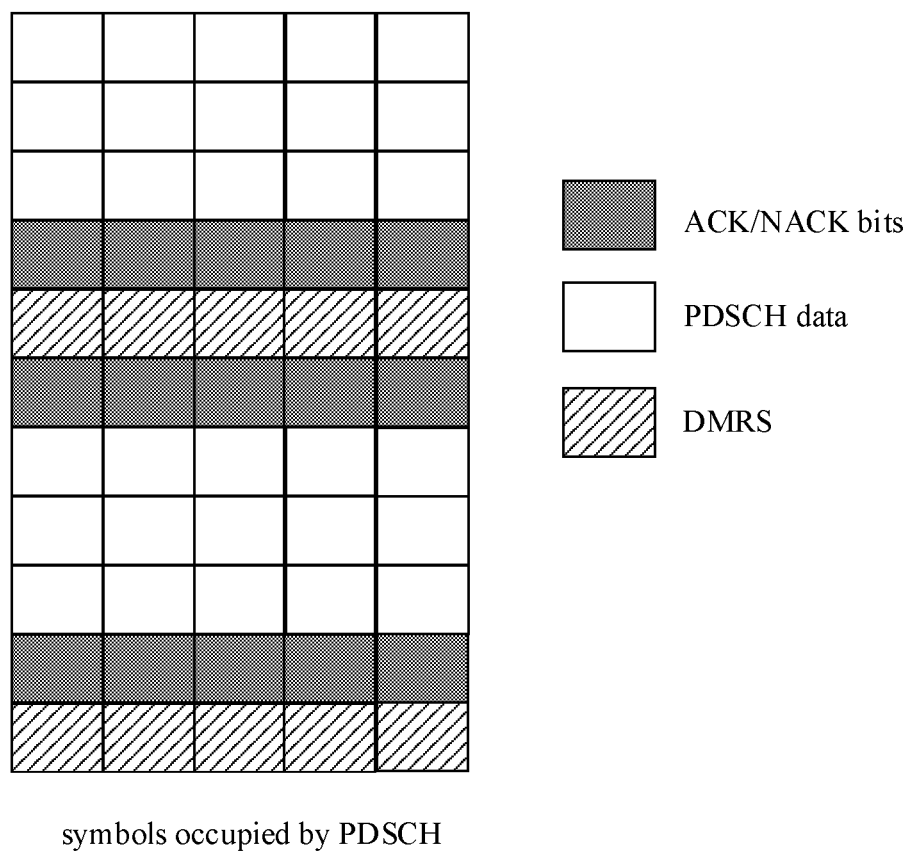
FIG. 4 is a mapping table of control information according to an exemplary embodiment of the present disclosure.

In an optional embodiment based on FIG. 3, the above designated frequency domain positions are located on two sides of frequency domain resource positions occupied by a pilot signal. As shown in FIG. 4, when performing resource mapping, the bits that may be occupied by ACK/NACK do not need to be considered. In performing ACK/NACK mapping, the bits originally occupied by the PDSCH are directly occupied.

The following are apparatus embodiments of the present disclosure. For details not described in detail in the apparatus embodiments, reference may be made to the above-described one-to-one correspondence method embodiment.

Figure 5:
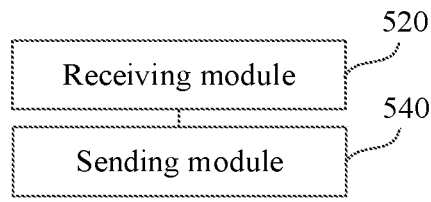
FIG. 5 is a block diagram of an apparatus for transmitting control information according to another exemplary embodiment of the present disclosure.

FIG. 5 shows a block diagram of a feedback apparatus for uplink transmission according to a schematic embodiment of the present disclosure. The apparatus may be implemented as all or part of a base station (or of an access network device) by software, hardware, or a combination of both. The apparatus includes a receiving module 520 and a sending module 540. The receiving module 520 and the sending module 540 may be hardware devices such as a radio frequency antenna.

A receiving module 520 is configured to receive uplink data sent by a terminal in a time slot n of a PUSCH.

A sending module 540 is configured to send control information to the terminal at designated frequency domain positions of the slot n+k of a PDSCH. The n and k are integers.

In an alternative embodiment, the control information includes at least one of the following:
an ACK of the uplink data;
a NACK of the uplink data;
channel quality information of the PUSCH; and
power control information of the terminal.

In an alternative embodiment, the sending module 540 is further configured to configure the k to the terminal by using a target PDCCH format. The target PDCCH format is a PDCCH format 0_0 or a PDCCH format 0_1 that is used for configuring the PUSCH. Alternatively, the sending module 540 is further configured to configure the k to the terminal by using RRC signaling.

In an alternative embodiment, the value of k is 0.

In an alternative embodiment, the designated frequency domain positions are located on two sides of a frequency domain resource position occupied by the pilot signal.

In an alternative embodiment, the receiving module 520 is further configured to receive next uplink data sent by the terminal at a designated resource position. The next uplink data is sent by the terminal after receiving an ACK feedback in the control information. Alternatively, the receiving module 520 is further configured to receive the uplink data retransmitted by the terminal at the designated resource position. The uplink data is sent by the terminal after receiving a NACK feedback in the control information.

In an alternative embodiment, the designated resource position is a resource position configured by using a PDCCH.

In an alternative embodiment, the designated resource position is a preconfigured resource position used for unauthorized transmission.

Figure 6:
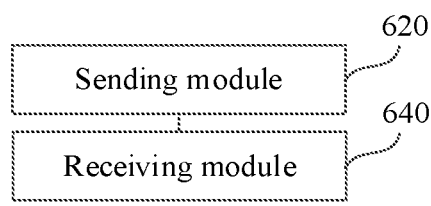
FIG. 6 is a block diagram of an apparatus for transmitting control information according to another exemplary embodiment of the present disclosure.

FIG. 6 shows a block diagram of a retransmission apparatus for uplink transmission according to a schematic embodiment of the present disclosure. The apparatus may be implemented as all or a part of a terminal by software, hardware, or a combination both. The apparatus includes a sending module 620 and a receiving module 640. The sending module 620 and the receiving module 640 may be hardware devices such as a radio frequency antenna.

The sending module 620 is configured to send uplink data to a base station in a time slot n of a PUSCH;

The receiving module 640 is configured to receive control information sent by the base station at designated frequency domain positions of a time slot n+k of the PDSCH. The n and k are integers In an alternative embodiment, the control information includes at least one of the following:
an ACK of the uplink data;
a NACK of the uplink data;
channel quality information of the PUSCH; and
power control information of the terminal.

In an alternative embodiment, the receiving module 640 is configured to receive a target PDCCH format sent by the base station. The target PDCCH is used for configuring the k, and the target PDCCH format is a PDCCH format 0_0 or a PDCCH format 0_1 that is used for configuring the PUSCH. Alternatively, the receiving module 660 is configured to receive RRC signaling sent by the base station, and the RRC signaling is used for configuring the k.

In an alternative embodiment, the value of k is 0.

In an alternative embodiment, the designated frequency domain positions are located on two sides of a frequency domain resource position occupied by a pilot signal.

In an alternative embodiment, the sending module 620 is configured to: when the control information includes an ACK, send next uplink data at a designated resource position, or when the control information comprises a NACK, retransmit the uplink data at the designated resource position.

In an alternative embodiment, the designated resource position is a resource position configured by using a PDCCH; or, the designated resource position is a preconfigured resource position used for unauthorized transmission.

Figure 7:
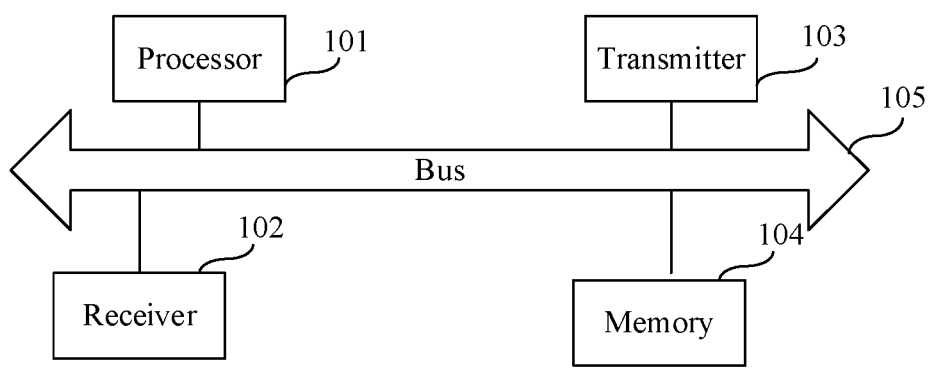
FIG. 7 is a block diagram of a terminal according to an exemplary embodiment of the present disclosure.

FIG. 7 illustrates a block diagram of a terminal according to an exemplary embodiment of the present disclosure. The terminal includes a processor 101, a receiver 102, a transmitter 103, a memory 104, and a bus 105.

The processor 101 includes one or more processing cores. The processor executes various functional applications and information processing by running software programs and modules.

The receiver 102 and the transmitter 103 may be implemented as a communication component. The communication component may be a communication chip.

The memory 104 is connected to the processor 101 via the bus 105.

The memory 104 may be used to store at least one instruction, and the processor 101 may be used to execute the at least one instruction to implement the various steps in the method embodiments described above.

Furthermore, the memory 104 may be implemented by any type of volatile or non-volatile storage device or a combination of both. The volatile or non-volatile storage device includes, but is not limited to, a magnetic disk or optical disk, an electrically erasable programmable read-only memory (EEPROM), an erasable programmable read-only memory (EPROM), a static anytime access memory (SRAM), a read-only memory (ROM), a magnetic memory, a flash memory, and a programmable read-only memory (PROM).

In an exemplary embodiment, a computer readable storage medium is further provided. The readable storage medium stores at least one instruction, at least one segment of a program, a code set, or an instruction set. The at least one instruction, the at least one segment of a program, the code set, or the instruction set is loaded by the processor and is executed to implement a method for transmitting control information provided by the above-described various method embodiments.

Figure 8:
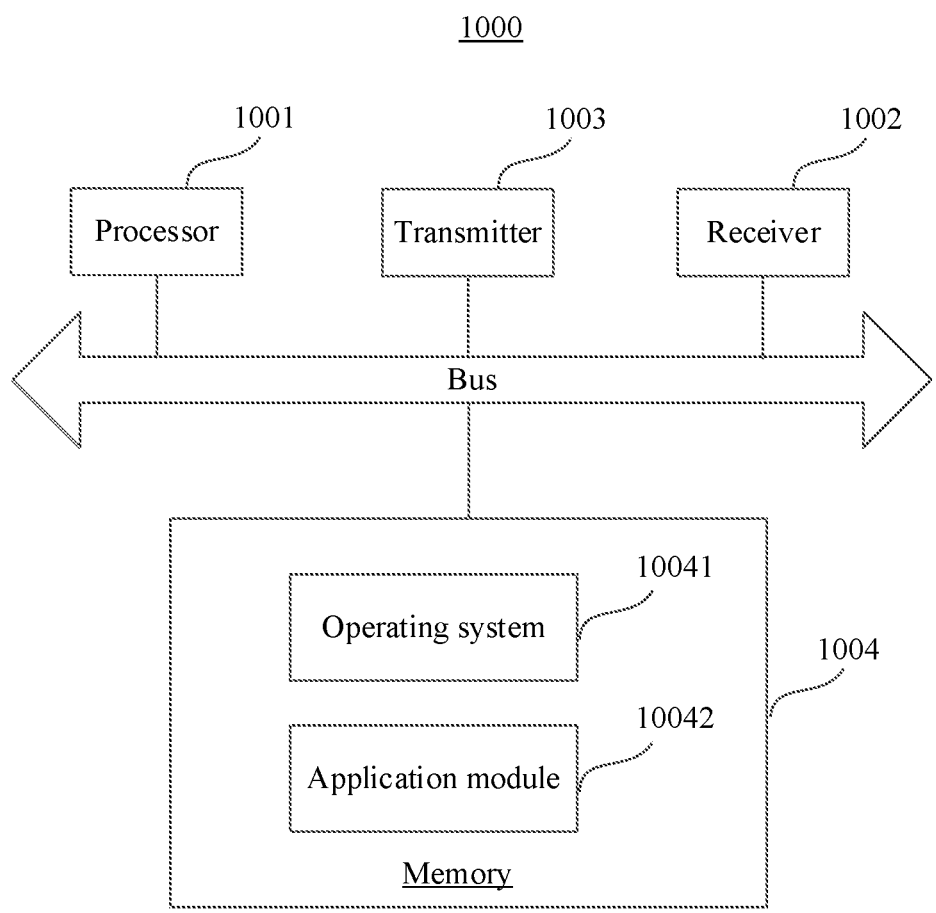
FIG. 8 is a block diagram of an access network device (base station) according to an exemplary embodiment of the present disclosure.

FIG. 8 is a block diagram of an access network device 1000 according to an exemplary embodiment.

The access network device 1000 may include a processor 1001, a receiver 1002, a transmitter 1003, and a memory 1004. The receiver 1002, the transmitter 1003, and the memory 1004 are connected to the processor 1001 respectively via a bus.

The processor 1001 includes one or more processing cores, and the processor 1001 executes the method performed by the access network device in the transmission configuration method provided by the embodiments of the present disclosure by running software programs and modules. The memory 1004 may be used to store software programs and modules. The memory 1004 may store an operating system 10041, an application module 10042 required for at least one function. The receiver 1002 is used to receive communication data sent by other devices, and the transmitter 1003 is used to send communication data to the other devices.

In an exemplary embodiment, a computer readable storage medium is further provided. The computer readable storage medium stores at least one instruction, at least one segment of a program, a code set, or an instruction set. The at least one instruction, the at least one segment of a program, the code set, or the instruction set is loaded by the processor and is executed to implement steps in a method for transmitting control information provided by the above-described various method embodiments.

A person of ordinary skill in the art should be understood that all or part of the steps of the above-described embodiments may be implemented by hardware, or may be implemented by a program instructing relevant hardware. The program may be stored in a computer readable storage medium, which may be a read-only memory, a magnetic disk, an optical disk, or the like.

The foregoing description is merely a preferred embodiment of the present disclosure and is not intended to limit the present disclosure. Any modifications, equivalent substitutions, modifications, etc. made within the spirit and principles of the present disclosure shall fall within the scope of the present disclosure.

What is claimed is:

1. A method for transmitting control information, comprising:
   receiving, in a time slot n of a Physical Uplink Shared Channel (PUSCH), uplink data sent by a terminal; and
   sending, at designated frequency domain positions of a time slot n+k of a Physical Downlink Shared Channel (PDSCH), control information to the terminal, wherein n and k are integers, wherein an interval between receiving the uplink data sent by the terminal and sending the control information to the terminal is k time slots, wherein the control information comprises at least one of:
   an acknowledgement (ACK) feedback of the uplink data;
   a negative acknowledgement (NACK) feedback of the uplink data;
   channel quality information of the PUSCH; and
   power control information of the terminal;
   wherein the method further comprises:
   configuring k to the terminal by using a target Physical Downlink Control Channel (PDCCH) format, wherein the target PDCCH format is a PDCCH format 0_0 or a PDCCH format 0_1 that is used for configuring the PUSCH; or
   configuring k to the terminal by using Radio Resource Control (RRC) signaling.

2. The method of claim 1, wherein the designated frequency domain positions are located on two sides of a frequency domain resource position occupied by a pilot signal.

3. The method of claim 1, further comprising:
   receiving next uplink data sent by the terminal at a designated resource position, wherein the next uplink data is sent by the terminal after receiving an ACK feedback in the control information; or
   receiving the uplink data retransmitted by the terminal at the designated resource position, wherein the uplink data is sent by the terminal after receiving a NACK feedback in the control information.

4. The method of claim 3, wherein the designated resource position is a resource position that is configured by using a PDCCH; or
   wherein the designated resource position is a preconfigured resource position used for unauthorized transmission.

5. A method for transmitting control information, comprising:
   sending, in a time slot n of a Physical Uplink Shared Channel (PUSCH), uplink data to a base station; and
   receiving, at designated frequency domain positions of a time slot n+k of a Physical Downlink Shared Channel (PDSCH), control information sent by the base station, wherein n and k are integers, wherein an interval between sending the uplink data to the base station and receiving the control information sent by the base station is k time slots, wherein the control information comprises at least one of:
   an acknowledgement (ACK) feedback of the uplink data;
   a negative acknowledgement (NACK) feedback of the uplink data;
   channel quality information of the PUSCH; and
   power control information of the terminal;
   wherein the method further comprises:
   receiving a target Physical Downlink Control Channel (PDCCH) format sent by the base station, wherein the target PDCCH format is used for configuring k, and the target PDCCH format is a PDCCH format 0_0 or a PDCCH format 0_1 that is used for configuring the PUSCH; or receiving Radio Resource Control (RRC) signaling sent by the base station, wherein the RRC signaling is used for configuring k.

6. The method of claim 5, wherein a value of k is 0.

7. The method of claim 5, wherein the designated frequency domain positions are located on two sides of a frequency domain resource position occupied by a pilot signal.

8. The method of claim 5, further comprising:
when the control information comprises an ACK feedback, sending next uplink data at a designated resource position; or
when the control information comprises a NACK feedback, retransmitting the uplink data at the designated resource position.

9. The method of claim 8, wherein
the designated resource position is a resource position that is configured by using a PDCCH; or
the designated resource position is a preconfigured resource position used for unauthorized transmission.

10. A terminal comprising:
a processor;
a transceiver connected to the processor; and
a memory for storing instructions executable by the processor;
wherein the processor is configured to load and execute the executable instructions to perform:
sending, in a time slot n of a Physical Uplink Shared Channel (PUSCH), uplink data to a base station; and
receiving, at designated frequency domain positions of a time slot n+k of a Physical Downlink Shared Channel (PDSCH), control information sent by the base station, wherein n and k are integers, wherein an interval between sending the uplink data to the base station and receiving the control information sent by the base station is k time slots, wherein the control information comprises at least one of:
an acknowledgement (ACK) feedback of the uplink data;
a negative acknowledgement (NACK) feedback of the uplink data;
channel quality information of the PUSCH; and
power control information of the terminal;
wherein the processor is further configured to load and execute the executable instructions to:
receive a target Physical Downlink Control Channel (PDCCH) format sent by the base station, wherein the target PDCCH format is used for configuring k, and the target PDCCH format is a PDCCH format 0_0 or a PDCCH format 0_1 that is used for configuring the PUSCH; or
receive Radio Resource Control (RRC) signaling sent by the base station, wherein the RRC signaling is used for configuring k.

11. The terminal of claim 10, wherein a value of k is 0.

12. The terminal of claim 10, wherein the designated frequency domain positions are located on two sides of a frequency domain resource position occupied by a pilot signal.

13. The terminal of claim 10, wherein the processor is further configured to load and execute the executable instructions to perform:
when the control information comprises an ACK feedback, sending next uplink data at a designated resource position; or
when the control information comprises a NACK feedback, retransmitting the uplink data at the designated resource position.

* * * * *